(12) United States Patent
Nakamura et al.

(10) Patent No.: US 7,046,507 B2
(45) Date of Patent: May 16, 2006

(54) INFORMATION PROCESSING APPARATUS

(75) Inventors: Shingo Nakamura, Itami (JP); Hiroshi Kashino, Takatsuki (JP); Toshihiro Nakai, Kyoto (JP); Shoji Saibara, Suita (JP)

(73) Assignees: Hitachi Maxell, Ltd., Osaka (JP); Hitachi, Ltd., Tokyo (JP)

( * ) Notice: Subject to any disclaimer, the term of this patent is extended or adjusted under 35 U.S.C. 154(b) by 297 days.

(21) Appl. No.: 10/746,088

(22) Filed: Dec. 26, 2003

(65) Prior Publication Data

US 2004/0136156 A1 Jul. 15, 2004

(30) Foreign Application Priority Data

Dec. 26, 2002 (JP) .............................. 2002-378350

(51) Int. Cl.
*G06F 1/16* (2006.01)

(52) U.S. Cl. ...................................... 361/681; 361/679

(58) Field of Classification Search ................ 361/679, 361/681
See application file for complete search history.

(56) References Cited

U.S. PATENT DOCUMENTS

2004/0224209 A1* 11/2004 Ninomiya et al.

FOREIGN PATENT DOCUMENTS

| JP | 2002-49440 | | 2/2002 |
|---|---|---|---|
| JP | 2002-049440 | * | 2/2002 |
| JP | 2002-56855 | | 2/2002 |
| JP | 2002-056855 | * | 2/2002 |

OTHER PUBLICATIONS

Patent Abstracts of Japan, Publication No. 2002-049440 dated Feb. 15, 2002, 2 pgs.
Patent Abstracts of Japan, Publication No. 2002-056855 dated Feb. 22, 2002, 2 pgs.

* cited by examiner

*Primary Examiner*—Yean-Hsi Chang
(74) *Attorney, Agent, or Firm*—Birch, Stewart, Kolasch & Birch, LLP (57) ABSTRACT

An exemplary information processing apparatus of the present invention includes: a body portion having a control device; and a display portion having a display panel connected to the body portion via a hinge so as to be swingably opened or closed. A power generation portion of a fuel cell, having positive electrodes, negative electrodes, and electrolyte layers placed between the positive electrodes and the negative electrodes is provided in a housing of the display portion. The positive electrodes of the power generation portion are disposed on a back side or a display panel side of the display portion. Air holes for supplying air to the positive electrodes are provided on at least one selected from a back side of the housing and a display panel side of the housing. A fuel cartridge for supplying liquid fuel to the power generation portion is incorporated in the body portion. Thus, the information processing apparatus can be decreased in thickness and miniaturized.

10 Claims, 5 Drawing Sheets

INFORMATION PROCESSING APPARATUS

BACKGROUND OF THE INVENTION

1. Field of the Invention

The present invention relates to an information processing apparatus using a fuel cell as a power source.

2. Description of the Related Art

Recently, with the spread of cordless equipment such as a personal computer and a mobile telephone, there is an increasing demand for miniaturization and an increased capacity of a secondary battery that is a power source of the cordless equipment. Currently, a lithium ion secondary battery is being put to practical use as a secondary battery with high energy density that can be reduced in size and weight, and there is an increasing demand for such a lithium ion secondary battery as a portable power source. However, depending upon the kind of cordless equipment to be used, a lithium secondary battery has not ensured a sufficient continuous use time.

In such a circumstance, a fuel cell is expected as a battery satisfying the above-mentioned demand. Among them, a liquid fuel cell such as a direct methanol type fuel cell (DMFC) using liquid fuel directly for the reaction of a battery can be miniaturized, and thus, it has a potential as a future portable power source.

A fuel cell preferable as a power source of portable equipment such as a notebook personal computer is known, for example, in JP 2002-56855 A, and the like. A power generation portion of the fuel cell has a flat shape in which a number of cells are combined in a matrix. Each cell is composed of a positive electrode (air electrode), a negative electrode (fuel electrode), and an electrolyte layer placed between the positive and negative electrodes.

Furthermore, incorporating a power generation portion of a fuel cell into a housing of a display portion of an information processing apparatus such as a notebook personal computer is known, for example, in JP 2002-49440 A. In the information processing apparatus described in JP 2002-49440 A, a fuel cartridge is provided on an upper end face of the display portion, and liquid fuel is supplied from the fuel cartridge to the power generation portion.

According to the configuration described in JP 2002-49440 A, a channel for introducing air is formed in the display portion so as to pass therethrough vertically, and air is supplied to the positive electrodes through the channel. Therefore, an increase in thickness of the display portion by the thickness of the channel cannot be avoided, which may enlarge a notebook personal computer. Furthermore, when the fuel cartridge is placed in an upper part of the display portion, the cartridge is very conspicuous, resulting in an unsatisfactory outer appearance.

SUMMARY OF THE INVENTION

The present invention provides an information processing apparatus, including: a body portion having a control device; and a display portion having a display panel, connected to the body portion via a hinge so as to be swingably opened or closed. A power generation portion of a fuel cell, having positive electrodes, negative electrodes, and electrolyte layers placed between the positive electrodes and the negative electrodes, is provided in a housing of the display portion. The positive electrodes of the power generation portion are disposed on at least one selected from a back side of the display portion and a display panel side of the display portion, and air holes for supplying air to the positive electrodes are provided on at least one selected from a back side of the housing and a display panel side of the housing.

These and other advantages of the present invention will become apparent to those skilled in the art upon reading and understanding the following detailed description with reference to the accompanying figures.

DESCRIPTION OF THE PREFERRED EMBODIMENTS

Figure 1:
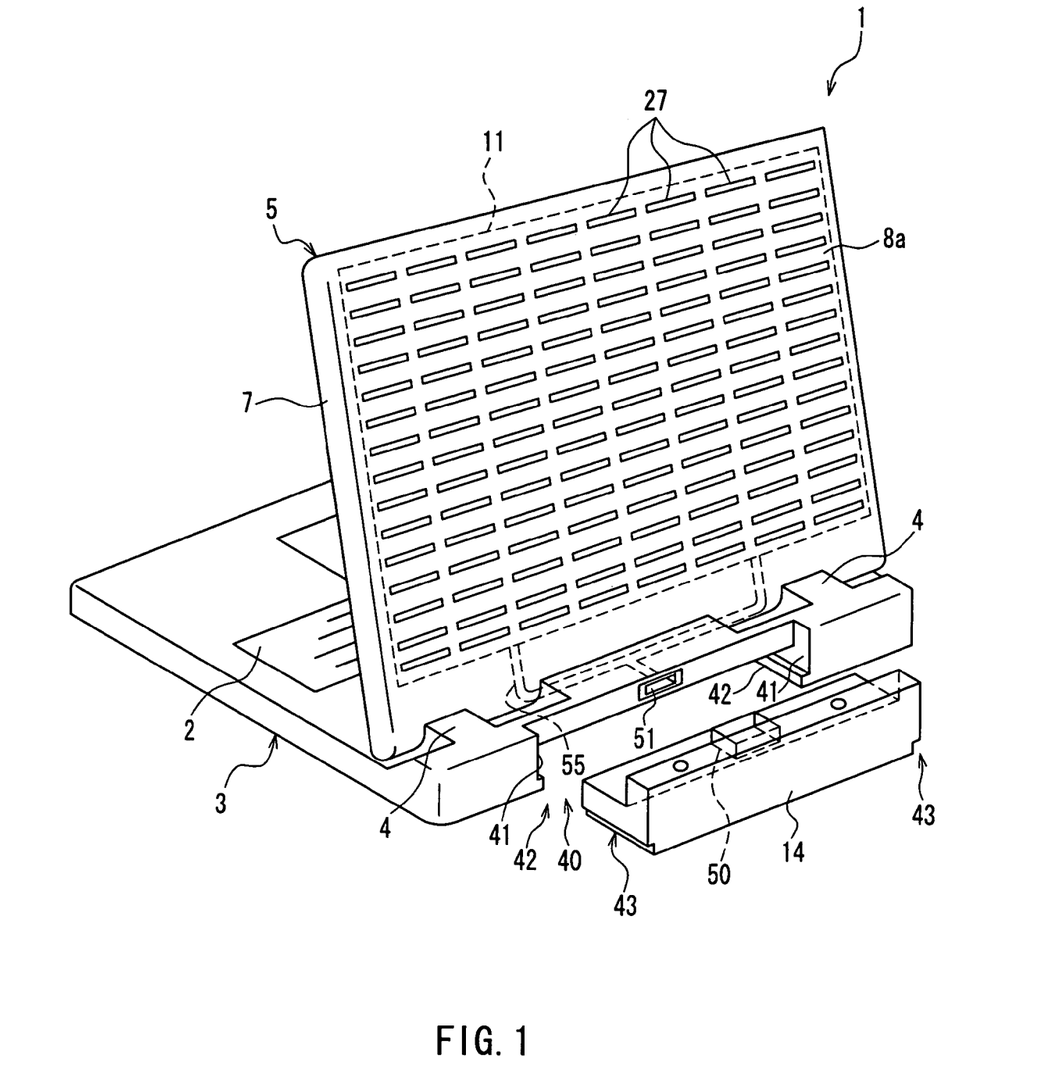
FIG. 1 is a perspective view of an information processing apparatus according to Example 1 of the present invention seen from a back side.
Figure 2:
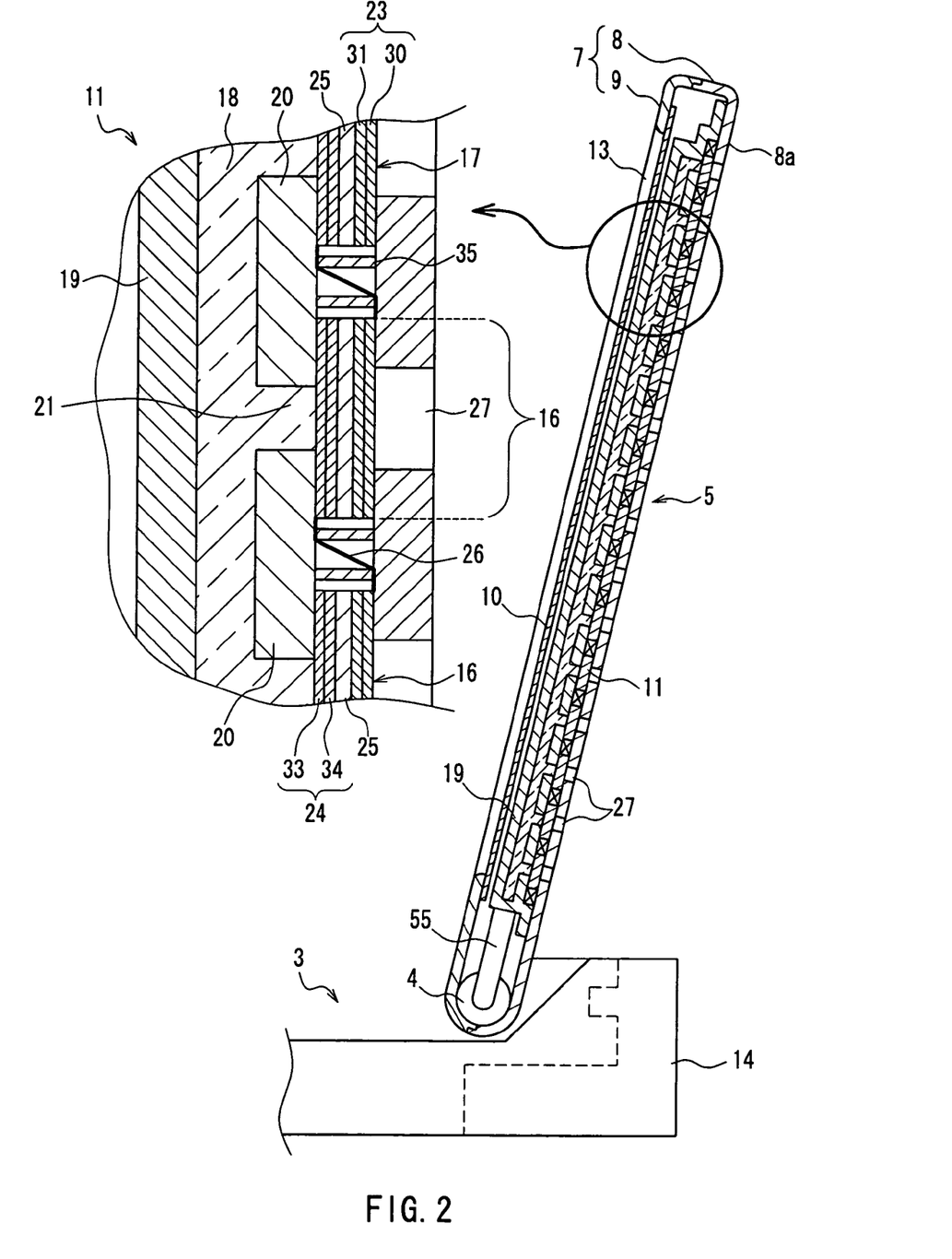
FIG. 2 is a vertical cross-sectional view of the information processing apparatus shown in FIG. 1.

An exemplary information processing apparatus of the present invention will be described with reference to FIGS. 1 to 5 corresponding to examples of the present invention. As shown in FIGS. 1 and 2, the exemplary information processing apparatus of the present invention includes a body portion 3 provided with a control device, and a display portion connected to the body portion 3 via a hinge 4 so as to be swingably opened or closed. In a housing 7 of the display portion 5, a display panel 10 and a power generation portion 11 of a fuel cell are incorporated. The power generation portion 11 includes positive electrodes 23 that reduce oxygen, negative electrodes 24 that oxidize fuel, and electrolyte layers 25 placed between the positive electrodes 23 and the negative electrodes 24. As shown in FIGS. 2 and 5, in a thickness direction of the display portion 5, the positive electrodes 23 are placed on at least one of a back side and a display panel side opposite to the back side of the display portion 5, and air holes 27 for supplying air to the positive electrodes 23 are placed on at least one of a back side and a display panel side of the housing 7. Furthermore, in the exemplary information processing apparatus of the present invention, there is no particular limit to a method for supplying liquid fuel to the power generation portion 11. For example, although liquid fuel can be supplied from outside of the information processing apparatus, by incorporating the fuel cartridge 14 for supplying liquid fuel into the body portion 3, the portability of the information processing apparatus can be enhanced.

Figure 4:
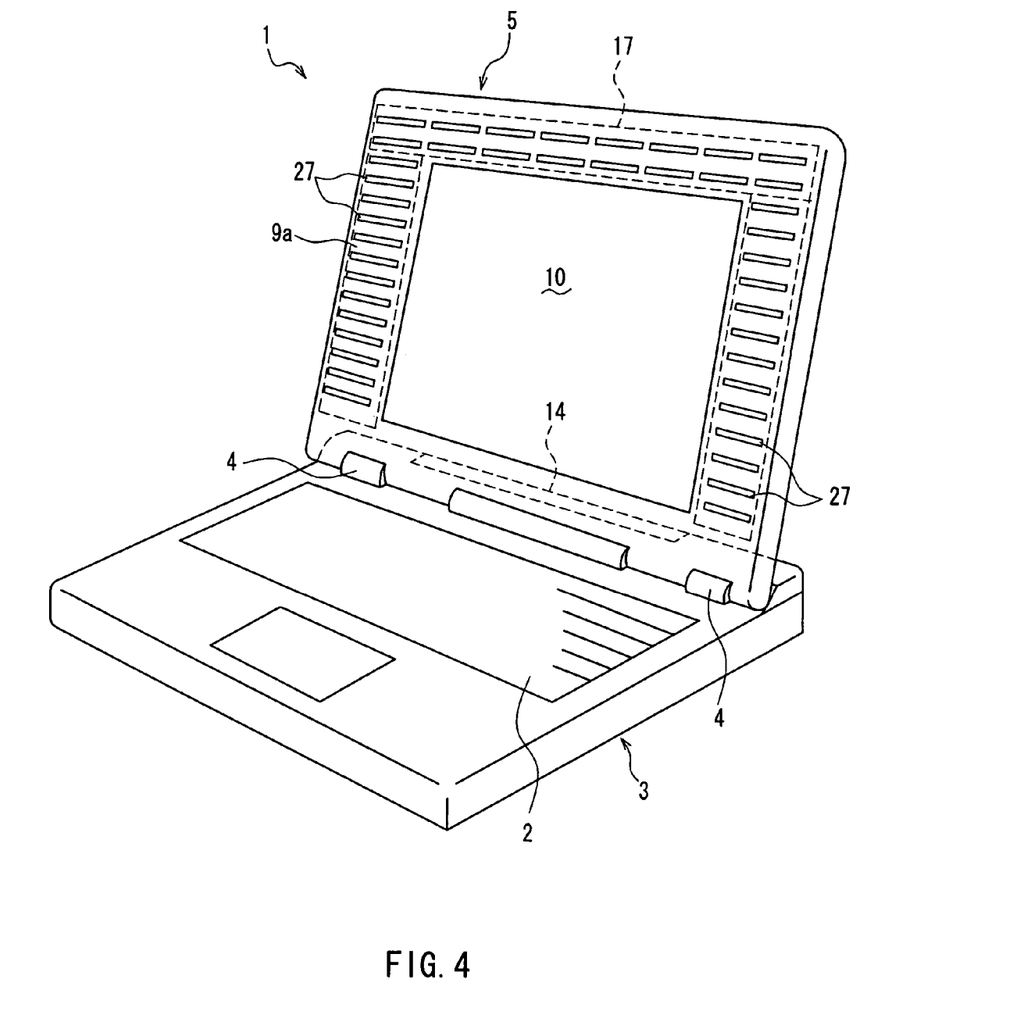
FIG. 4 is a perspective view of an information processing apparatus according to Example 2 seen from a front side.
Figure 5:
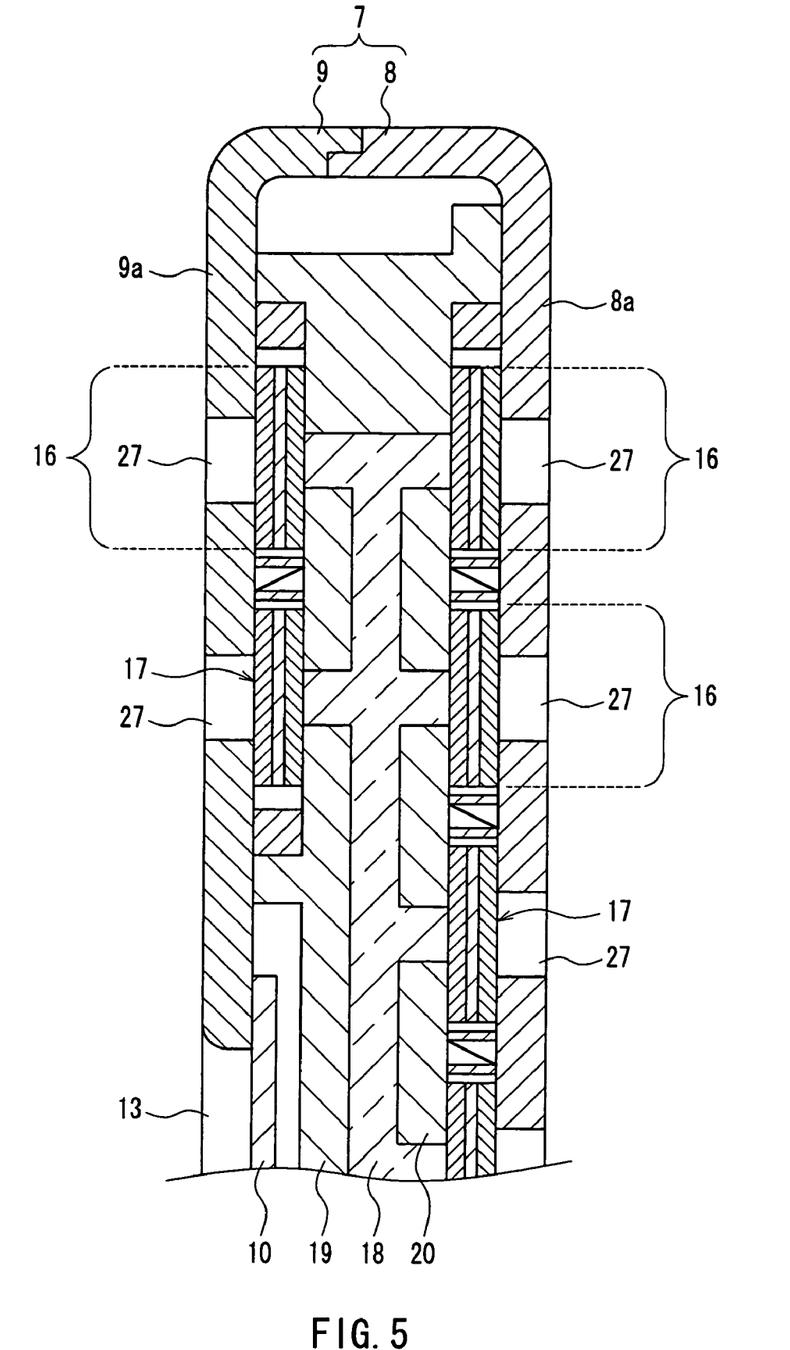
FIG. 5 is a vertical cross-sectional view showing main portions of the information processing apparatus shown in FIG. 4.

The information processing apparatus according to the present invention is not limited to a notebook personal computer shown in FIGS. 1 or 4, and includes various kinds of mobile equipment such as a personal digital assistance (PDA) and a mobile telephone. The information processing apparatus according to the present invention is applied to an information processing apparatus requiring a portable power source. The display panel 10 is not limited to a liquid crystal display panel, and may be an organic electroluminescence display panel.

In one embodiment of the information processing apparatus of the present invention, the power generation portion 11 is incorporated in the housing 7 of the display portion 5, the positive electrodes 23 of the power generation portion 11 are placed on the back side of the display portion 5, and the air holes 27 are placed on the back side or the display panel side of the housing 7 of the display portion 5. Therefore, an increase in thickness and enlargement of the display portion 5 caused by incorporating the power generation portion 11 are minimized, which can contribute to a decrease in thickness and miniaturization of the information processing apparatus. It also is possible that the power generation portion 11 is formed in a flat shape so as to have an occupied area that is substantially the same as that of the housing 7 of the display portion 5. This will keep a large electrode area, so that the battery performance can be enhanced. Furthermore, if the air holes 27 are provided on the back side of the housing 7 of the display portion 5, the air holes 27 are provided over the entire back surface of the housing 7 to ensure a large surface for introducing air to the positive electrodes 23. Thus, a power generation effective area ratio of the positive electrodes 23 can be increased to enhance the battery performance.

Furthermore, even in an embodiment in which the positive electrodes 23 of the power generation portion 11 are placed so as to be positioned on the display panel side of the display portion 5, and the air holes 27 are placed on the back side or the display panel side of the housing 7 of the display portion 5, an increase in thickness and enlargement of the display portion 5 are minimized, and the information processing apparatus can be made thinner and smaller, in the same way as in the previous embodiment. It also is possible that the power generation portion 11 is formed in a flat shape so as to be substantially flush with the display panel 10. This can make the display panel 10 even thinner. Furthermore, when the air holes 27 are provided on the display panel side of the housing 7 of the display portion 5, an inflow path of air leading to the positive electrodes 23 can be shortened, which can make the information processing apparatus further thinner.

The negative electrodes 24 only have to be placed on an inner side of the display portion 5 with respect to the positive electrodes 23 in a thickness direction of the display portion 5.

The power generation portion 11 generally has a configuration in which a plurality of cells 16 are arranged in a flat shape, as shown in FIG. 2. When each cell 16 is formed as a unit component including the positive electrode 23, the negative electrode 24, and the electrolyte layer 25, the space inside the housing 7 of the display portion 5 can be used effectively. This contributes to a decrease in thickness and miniaturization of the display portion 5. Furthermore, the number of components constituting the power generation portion 11 is decreased, so there are a fewer number of assembling steps, which contributes to a reduction in a production cost of the information processing apparatus.

Furthermore, the fuel cartridge 14 for supplying liquid fuel to the power generation portion 11 is mounted on the body portion 3 (particularly, in the vicinity of the hinge 4) instead of the upper part of the display portion 5, whereby the information processing apparatus can be made excellent in an outer appearance without allowing the fuel cartridge 14 to be conspicuous. Furthermore, in the body portion 3 of this type of notebook personal computer, an end portion on the back side in the vicinity of the hinge 4 generally is a dead space. The fuel cartridge 14 is mounted on this portion, whereby the dead space can be used effectively, and the enlargement of the information processing apparatus by incorporating the fuel cartridge 14 can be minimized. Herein, the fuel cartridge 14 can be detachably mounted on the body portion 3 in the vicinity of the hinge 4. By detachably mounting the fuel cartridge 14 on the body portion 3, the fuel cartridge 14 can be removed when the information processing apparatus is not being used, and the supply of fuel to the body portion 3 can be stopped precisely. Thus, waste consumption of fuel caused by stand-by electric power and the like is suppressed to prolong the life of the fuel cartridge 14.

Figure 3:
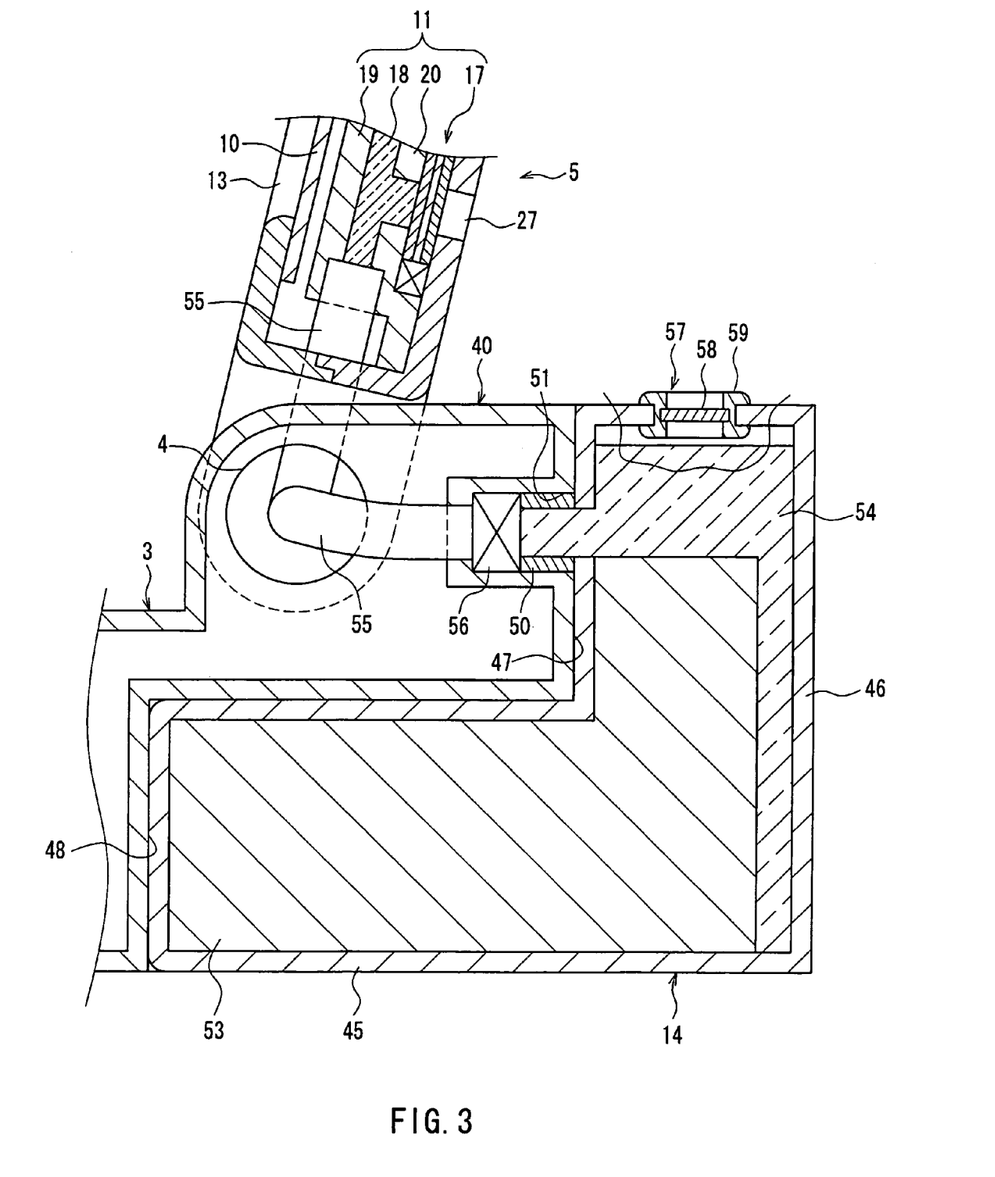
FIG. 3 is a vertical cross-sectional view showing main portions of the information processing apparatus shown in FIG. 1.

Furthermore, as shown in FIG. 3, a gas-liquid separation film 58 is provided at the fuel cartridge 14, whereby carbon dioxide and the like generated in a discharge reaction can be released to the atmosphere without allowing liquid fuel in the fuel cartridge 14 to leak.

The exemplary information processing apparatus of the present invention has a fuel path extending from the fuel cartridge 14 to the negative electrodes 24 of the power generation portion 11. In the fuel path, a fuel pumping material 18, which is impregnated with and holds liquid fuel, and comes into contact with the negative electrodes 24 to supply the liquid fuel thereto, can be provided. In the configuration in which liquid fuel is forcefully pumped up by a pump, the power consumption is increased by the driving force of the pump, and the movable mechanism part is enlarged, making it difficult to reduce the information processing apparatus in size and weight. Furthermore, when the amount of the fuel in the fuel cartridge 14 becomes small, the liquid sending ability of the pump is decreased remarkably, which makes it impossible to consume the fuel completely. In this respect, when the fuel pumping material 18 is provided in the fuel path, and the fuel is pumped up by the capillary action of the fuel pumping material 18, there is no inconvenience such as an increase in power consumption as in the pump, which can reduce the information processing apparatus in size and weight. Furthermore, since the fuel in the fuel cartridge 14 can be consumed completely, the life of the fuel cartridge 14 can be prolonged.

Next, examples of the information processing apparatus of the present invention will be described with reference to the drawings.

EXAMPLE 1

FIGS. 1 to 3 show an exemplary information processing apparatus of the present invention suitable for a notebook personal computer. In FIG. 1, a notebook personal computer 1 includes a control device such as a central processing unit (CPU) and a memory, a body portion 3 provided with a keyboard 2 that is an input device, and a display portion 5 connected to the body portion 3 at an end on a back side thereof via a hinge 4 so as to be swingably opened or closed.

In FIG. 2, a housing 7 of the display portion 5 has a configuration in which a back cover 8 in a rectangular plate shape that opens on a front side and a front cover 9 in a rectangular frame shape are engaged with each other. In the housing 7, a liquid crystal display panel 10 that is an output device and a power generation portion 11 of a fuel cell that is a built-in power source of the notebook personal computer 1 are incorporated. The front cover 9 and the back cover 8 are made of plastic such as polytetrafluoroethylene (PTFE), rigid polyvinyl chloride, polypropylene, polyethylene, or the like. The front cover 9 and the back cover 8 also may be made of corrosion-resistant metal such as stainless steel, or may be made of a light metal material such as aluminum and its alloy, magnesium and its alloy, titanium and its alloy, or the like. The front cover 9 has a rectangular opening 13 at the center of its front side, and the liquid crystal display panel 10 is defined largely in the opening 13 on the front side. The power generation portion 11 is supplied with liquid fuel by a fuel cartridge 14 detachably mounted at an end on a back side of the body portion 3 in the vicinity of the hinge 4 via a fuel inducing member 55 (described later).

The power generation portion 11 of the fuel cell includes a power generation unit 17 in a flat shape composed of a number of cells 16, a fuel pumping material 18 for supplying fuel to the power generation unit 17, an inner case 19 provided on the side of the display panel 10 in a thickness direction of the display portion 5, for covering the entire front surface of the fuel pumping member 18, and a partition wall 20 provided on the side of the power generation unit 17 in a thickness direction of the display portion 5, for covering the entire back surface of the fuel pumping member 18. The partition wall 20 is provided with a number of independent through-holes 21 corresponding to the respective cells 16. The through-holes 21 also are filled with the fuel pumping material 18.

The power generation unit 17 has a flat plate shape in which the cells 16 including positive electrodes 23 that reduce oxygen, negative electrodes 24 that oxidize fuel, and electrolyte layers 25 placed between the positive electrodes 23 and the negative electrodes 24 are arranged in a matrix. The power generation unit 17 is attached to the liquid crystal display panel 10 on the back side in a thickness direction of the display portion 5. The surface size of the power generation unit 17 is set to be substantially the same as an inner surface size of a back wall 8a of the back cover 8, and the power generation unit 17 is mounted on the inner surface of the back wall 8a so as to be in contact therewith.

More specifically, each cell 16 has a rectangular shape (e.g., 80 mm (vertical) and 5 mm (horizontal)). A plurality of cells 16 are arranged in a flat shape in such a manner that the positive electrodes 23 are positioned on the back side of the display portion 5 in a thickness direction of the display portion 5, and the negative electrodes 24 are positioned on an inner side of the display portion 5 with respect to the positive electrodes 23, and the positive electrode 23 of one of adjacent cells 16 and the negative electrode 24 of the other cell 16 are electrically connected in series through a conductive connection plate 26, whereby the power generation unit 17 is configured. A plurality of independent air holes 27 are provided in portions of the back wall 8a of the back cover 8 that are in contact with the positive electrodes 23, and air (oxygen) is supplied to the positive electrodes 23 through the air holes 27. As described above, the power generation unit 17 of the present example is set so as to have substantially the same inner surface size as that of the back wall 8a of the back cover 8. Thus, herein, a number of air holes 27 are formed over the entire surface of the back wall 8a.

The positive electrode 23 is configured, for example, by stacking a diffusion layer 30 made of a porous carbon material and a catalyst layer 31 made of carbon powder carrying a catalyst. Examples of the catalyst contained in the catalyst layer 31 include platinum fine particles, and alloy fine particles of platinum and iron, nickel, cobalt, tin, ruthenium or gold. The catalyst layer 31 can contain PTFE resin particles and proton exchange resin particles. As the proton exchange resin particles, particles of polyperfluorosulfonic acid resin, sulfonated polyether sulfonic acid resin, sulfonated polyimide resin, and the like can be used. The surface of the diffusion layer 30 on the side of the catalyst layer 31 can be coated with a paste of carbon powder containing PTFE resin particles so as to enhance water repellency.

The electrolyte layer 25 is made of a material having no electron conductivity and being capable of transporting protons. An example of the material includes a polyperfluorosulfonic acid resin film. More specifically, "Nafion" produced by Dupont, "Flemion" produced by Asahi Glass Co. Ltd., "Asiplex" produced by Asahi Chemical Industry Co. Ltd., and the like can be used. A sulfonated polyether sulfonic acid resin film, a sulfonated polyimide resin film, a sulfuric acid doped polybenzimidazole film, and the like may be used.

The negative electrode 24 is composed of a diffusion layer 33 and a catalyst layer 34, and has a function of generating protons from fuel (i.e., function of oxidizing fuel). The negative electrode 24 can be configured in the same way as in the positive electrode 23, for example. The connection plate 26 can be made of noble metal (platinum, gold, etc.), corrosion-resistant metal (stainless steel, etc.), carbon, or the like.

The fuel pumping material 18 is, for example, nonwoven fabric made of glass fibers, and is contained in an air gap composed of the inner case 19 and the partition wall 20. As the fuel pumping material 18, another material also can be used as long as its size is not changed largely due to impregnation of fuel, and it is chemically stable.

Furthermore, in order to prevent fuel from flowing to the side of the positive electrodes 23 or flowing out of the cell, adjacent cells 16 are sealed with an insulator 35. The insulator 35 is made of synthetic rubber such as silicone rubber, fluorine rubber, butyl rubber and urethane rubber, an elastic insulating synthetic resin such as polypropylene, nylon and polyethylene, etc.

As shown in FIG. 1, an attachment portion 40 with a concave formed inward is provided at the center portion of an end on the back side of the body portion 3, and the fuel cartridge 14 is detachably mounted on the attachment portion 40. More specifically, at lower ends of right and left side walls 41, 41 partitioning the attachment portion 40 on the side of the body portion 3, flanges 42, 42 that are longer in a front and back direction project so as to be opposed to each other. At corner portions extending in a front and back direction of the right and left wall surfaces of the fuel cartridge 14 confronted to the flanges 42, 42, clearance grooves 43, 43 are cut away. The flanges 42, 42 and the clearance grooves 43, 43 are aligned, and thereafter, the fuel cartridge 14 is inserted in the attachment portion 40, whereby the fuel cartridge 14 is sidably supported along the flanges 42, 42 to be mounted on the body portion 3. Furthermore, by pulling the fuel cartridge 14 to the back side in a reverse procedure, the fuel cartridge 14 can be removed from the body portion 3.

As shown in FIG. 3, the fuel cartridge 14 has an L-shaped cross-section having a long portion 45 extending in a front and back direction, and a short portion 46 extending in a vertical direction. Corresponding thereto, the attachment portion 40 on the body portion 3 has a stepped shape composed of a first receiving surface 47 positioned on a back side and a second receiving surface 48 positioned on a front side of the first receiving surface 47. A fuel supply nozzle 50 made of rubber is formed at the short portion 46 of the fuel cartridge so as to project forward therefrom, and an opening 51 for receiving the nozzle 50 is provided on the first receiving surface 47 of the attachment portion 40. When the fuel cartridge 14 is inserted in the attachment portion 40, the fuel supply nozzle 50 is engaged with the opening 51 with an elastic restoration force as shown in FIG. 3. As a result, the fuel cartridge 14 is mounted on the body portion 3 completely. More specifically, the fuel cartridge 14 in a mounted state can be locked so as not to be slid.

In the mounted state of the fuel cartridge 14 as shown in FIG. 3, upper and lower surfaces of the fuel cartridge 14 are substantially flush with upper and lower surfaces of the body portion 3. Furthermore, the back surface of the cartridge 14 also is substantially flush with that of the body portion 3. Thus, the fuel cartridge 14 in a mounted state is not conspicuous, and does not impair the outer appearance of the notebook personal computer 1.

The fuel cartridge 14 includes a fuel tank 53, and a fuel absorbing member 54 placed between the fuel tank 53 and the fuel supply nozzle 50. The fuel absorbing member 54 is made of a porous member of sponge or the like, and sends the fuel in the fuel tank 53 to the fuel supply nozzle 50 by using the capillary action of the porous member. Examples of the fuel that is to fill the fuel tank 53 include a methanol aqueous solution, an ethanol aqueous solution, dimethyl ether, a sodium boron hydride aqueous solution, a potassium boron hydride aqueous solution, a lithium boron hydride aqueous solution, and the like. The fuel cartridge 14 is made of, for example, plastic such as PTFE, rigid polyvinyl chloride, polypropylene and polyethylene, or corrosion-resistant metal such as stainless steel. The fuel cartridge 14 also may be made of a light metal material such as aluminum and its alloy, magnesium and its alloy, titanium and its alloy, or the like.

The fuel inducing member 55 is placed between the opening 51 of the attachment portion 40 and the fuel pumping material 18 of the power generation portion 11 through a hollow inner portion of the hinge 4. The fuel inducing member 55 is a fiber flux filling a flexible tube, and introduces fuel in one direction from the opening 51 to a lower portion of the fuel pumping material 18 by the capillary action. The fibers constituting the fuel inducing member 55 are required to be chemically stable with respect to fuel and be excellent in wettability. Specific examples of the fibers include synthetic fibers such as polyester, nylon, polypropylene, polyurethane, and the like. Fibers of metal, glass, carbon, and the like also may be used.

In the mounted state of the fuel cartridge 14 as shown in FIG. 3, the fuel absorbing member 54 on the side of the fuel supply nozzle 50 and the fuel inducing member 55 on the side of the opening 51 are in contact with each other under a predetermined pressure. Thus, a fuel path is formed extending from the fuel tank 53 of the fuel cartridge 14 to the negative electrodes 24 of the power generation unit 17 via the fuel absorbing member 54, the fuel inducing member 55, and the fuel pumping material 18. Reference numeral 56 denotes a check valve placed between the fuel absorbing member 54 and the fuel inducing member 55.

As shown in FIG. 3, through-holes 57 leading to the fuel tank 53 are formed at two portions on an upper surface of the fuel cartridge 14, and a cap member 59 with a gas-liquid separation film 58 is detachably mounted in each through-hole 57. The cap member 59 is made of rubber, and is engaged with the through-hole 57 with an elastic restoration force. The gas-liquid separation film 58 is made of a PTFE sheet having pores, and releases carbon dioxide generated in a discharge reaction from the fuel tank 53 without allowing fuel to leak. It also may be possible that the cap member 59 is removed, and the fuel tank 53 is refilled with fuel through the through-hole 57. That is, the through-hole 57 also functions as a refill port in refilling of fuel.

As described above, according to the information processing apparatus of the present example, the power generation portion 11 is formed in a flat shape having an occupied area that is substantially the same as that of the housing 7 of the display portion 5. Therefore, a large electrode area can be obtained to enhance the battery performance. Since the power generation portion 11 is formed in a flat shape, an increase in thickness and enlargement of the housing 7 of the display portion 5 by incorporating the power generation portion 11 is minimized, which can contribute to a decrease in thickness and miniaturization of the information processing apparatus.

In addition, the positive electrodes 23 are placed so as to be positioned on the back side of the display portion 5 in a thickness direction of the display portion 5, and the air holes 27 are placed on the back side of the housing 7 of the display portion 5. Therefore, the air holes 27 can be provided over the entire back surface of the housing 7, as shown in FIG. 2. This enables a large surface for introducing air to the positive electrodes 23 to be obtained, so that the power generation effective area ratio of the positive electrodes 23 can be increased to enhance the battery performance. Furthermore, compared with the conventional embodiment in which a channel for introducing air is provided at the center of the display portion, the display portion 5 can be made thinner and smaller.

In the body portion 3 of this type of notebook personal computer, an end portion on the back side in the vicinity of the hinge 4 is likely to be a dead space. When the fuel cartridge 14 is mounted on a portion to be a dead space as in the present example, enlargement of the information processing apparatus by mounting the fuel cartridge 14 is minimized, which can contribute to miniaturization and a decrease in thickness of the information processing apparatus. Furthermore, since the portion that used to be a dead space is utilized, the design of the body portion 3 can be changed with a minimum of effort. In this respect, the present invention can contribute to a reduction in a production cost. The mounted fuel cartridge 14 is not conspicuous, and the outer appearance of the information processing apparatus will not be impaired.

The fuel cartridge 14 is detachably mounted on the body portion 3. Therefore, by removing the fuel cartridge 14 when the information processing apparatus is not being used, the supply of fuel to the body portion 3 can be stopped precisely. Thus, waste consumption of fuel caused by stand-by electric power and the like is suppressed to prolong the life of the fuel cartridge 14.

The fuel path includes the fuel pumping material 18, the fuel absorbing member 54, and the fuel introducing member 55, and the fuel is pumped up by their capillary action. Therefore, the power consumption due to the pumping of the fuel is not increased, which contributes to a reduction in power of the apparatus. Furthermore, since the fuel in the fuel cartridge 14 can be consumed completely, the life of the cartridge 14 is prolonged.

The cell 16 is formed as a unit component including the positive electrode 23, the negative electrode 24, and the electrolyte layer 25. Therefore, the number of components constituting the power generation portion 11 can be reduced. Thus, there are a fewer number of assembling steps, which contributes to a reduction in a production cost of the information processing apparatus.

EXAMPLE 2

FIGS. 4 and 5 show another exemplary information processing apparatus of the present invention. The information processing apparatus of the present example is substantially different from Example 1 in that the power generation unit 17 is provided not only on the back side in a thickness direction of the display portion 5 but also on the front side in a thickness direction of the display portion 5. More specifically, the power generation unit 17 is provided on the front side in a thickness direction so as to surround the liquid crystal display panel 10, and the air holes 27 are provided accordingly on the front side of the housing 7, i.e., on an opening circumferential edge 9a of the front cover 9.

In addition to the above example, it also may be possible that the power generation unit 17 is incorporated only on the front side in a thickness direction of the display portion 5, and the air holes 27 are provided on the front side of the housing 7, i.e., on the opening circumferential edge 9a of the front cover 9. The configuration of the fuel cartridge 14 and the method for mounting the fuel cartridge 14 on the body portion 3 are not limited to those described in the above example.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing apparatus, comprising:
   a body portion having a control device; and
   a display portion having a display panel, connected to the body portion via a hinge so as to be swingably opened or closed,
   a power generation portion of a fuel cell, having positive electrodes, negative electrodes, and electrolyte layers placed between the positive electrodes and the negative electrodes, being provided in a housing of the display portion,
   wherein the positive electrodes of the power generation portion are disposed on at least one selected from a back side of the display portion and a display panel side of the display portion, and
   air holes for supplying air to the positive electrodes are provided on at least one of a back side of the housing and a display panel side of the housing.

2. The information processing apparatus according to claim 1, wherein the positive electrodes of the power generation portion are disposed on the back side of the display portion, and the power generation portion has an occupied area that is substantially the same as that of the housing of the display portion.

3. The information processing apparatus according to claim 1, wherein the power generation portion comprises a plurality of cells arranged in a flat shape, and each of the cells is formed as a unit component including the positive electrode, the negative electrode, and the electrolyte layer.

4. The information processing apparatus according to claim 1, wherein the positive electrodes of the power generation portion are disposed on the display panel side of the display portion, and the power generation portion is disposed so as to be substantially flush with the display panel.

5. The information processing apparatus according to claim 1, wherein the negative electrodes are disposed so as to be positioned on an inner side of the display portion with respect to the positive electrodes in a thickness direction of the display portion.

6. The information processing apparatus according to claim 1, wherein the fuel cartridge for supplying liquid fuel to the power generation portion is incorporated in the body portion.

7. The information processing apparatus according to claim 6, wherein the fuel cartridge comprises a gas-liquid separation film.

8. The information processing apparatus according to claim 6, further comprising a fuel path extending from the fuel cartridge to the negative electrode of the power generation portion, and the fuel path includes a fuel pumping material for being impregnated with and holding liquid fuel and coming into contact with the negative electrodes to supply the liquid fuel to the negative electrodes.

9. The information processing apparatus according to claim 8, wherein the fuel path passes through an inside of the hinge.

10. The information processing apparatus according to claim 6, wherein the fuel cartridge is detachably mounted on the body portion in a vicinity of the hinge.

* * * * *